(12) United States Patent
Kono et al.

(10) Patent No.: US 9,118,839 B2
(45) Date of Patent: Aug. 25, 2015

(54) PERSONAL IDENTIFICATION SYSTEM

(71) Applicant: HITACHI, LTD., Chiyoda-ku, Tokyo (JP)

(72) Inventors: Miyuki Kono, Kokubunji (JP); Shin-ichiro Umemura, Hachioji (JP); Takafumi Miyatake, Hachioji (JP); Kunio Harada, Hachioji (JP); Yoshitoshi Ito, Ome (JP); Hironori Ueki, Kawasaki (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/269,729

(22) Filed: May 5, 2014

(65) Prior Publication Data

US 2014/0240480 A1    Aug. 28, 2014

Related U.S. Application Data

(63) Continuation of application No. 13/760,537, filed on Feb. 6, 2013, now Pat. No. 8,767,195, which is a continuation of application No. 13/416,307, filed on Mar. 9, 2012, now Pat. No. 8,384,885, which is a continuation of application No. 12/654,889, filed on Jan. 7, 2010, now Pat. No. 8,149,393, which is a continuation of application No. 11/976,681, filed on Oct. 26, 2007, now Pat. No. 7,671,977, which is a continuation of application No. 11/892,506, filed on Aug. 23, 2007, now Pat. No. 7,352,448, which is a continuation of application No. 11/104,564, filed on Apr. 13, 2005, now Pat. No. 7,277,163, which is a continuation of application No. 10/733,396, filed on Dec. 12, 2003, now Pat. No. 6,912,045, which is a continuation of application No. 09/954,067, filed on Sep. 18, 2001, now Pat. No. 6,813,010.

(30) Foreign Application Priority Data

Sep. 20, 2000    (JP) ................. 2000-290325

(51) Int. Cl.
*G06K 9/74* (2006.01)
*H04N 5/235* (2006.01)
*G06K 9/00* (2006.01)

(52) U.S. Cl.
CPC ............. *H04N 5/2354* (2013.01); *G06K 9/00* (2013.01); *G06K 9/00013* (2013.01); *G06K 9/00375* (2013.01); *G06K 2009/0006* (2013.01); *G06K 2009/00932* (2013.01)

(58) Field of Classification Search
CPC ........... G01J 3/513; G01J 3/02; G01J 3/0218; G01J 3/0251; G01J 3/2803; G01J 3/508; G01J 3/51; G01J 1/06; G01J 3/0205; G01J 3/0229; G01J 3/0259; G01J 3/0264; G01J 3/10; G01J 3/46; G01J 3/50
See application file for complete search history.

(56) References Cited

U.S. PATENT DOCUMENTS 5,335,288 A *   8/1994   Faulkner .................. 382/115

* cited by examiner

*Primary Examiner* — Michael P Stafira
(74) *Attorney, Agent, or Firm* — Nicholas Trenkle; Stites & Harbison, PLLC.

(57) ABSTRACT

A personal identification system, which uses a vein pattern of a finger, optimizes the amount of light of a light source based on a captured finger image and emphasizes the vein pattern during image processing for identification.

13 Claims, 15 Drawing Sheets

FIG. 12A
FIG. 12B
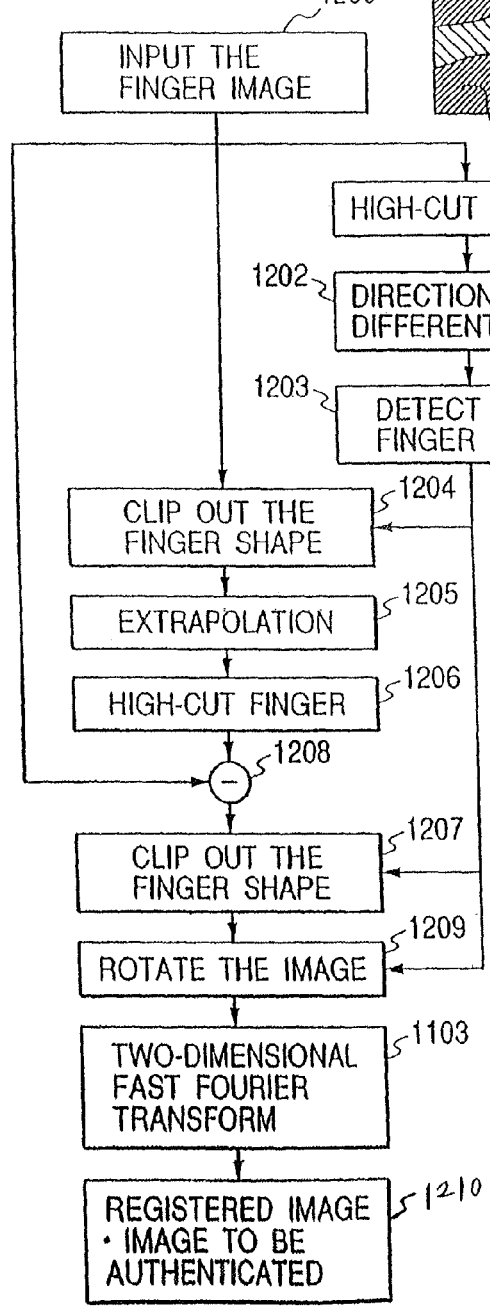
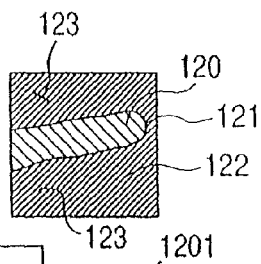
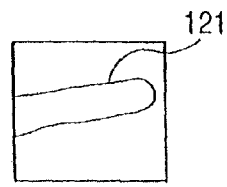
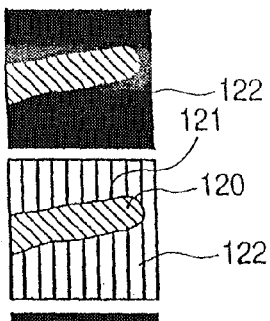
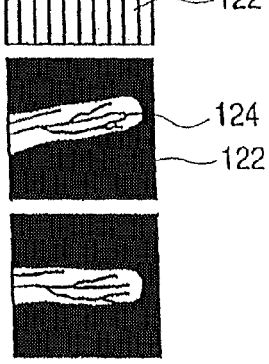
FIG. 12C
FIG. 12D
FIG. 12E
FIG. 12F
FIG. 12G

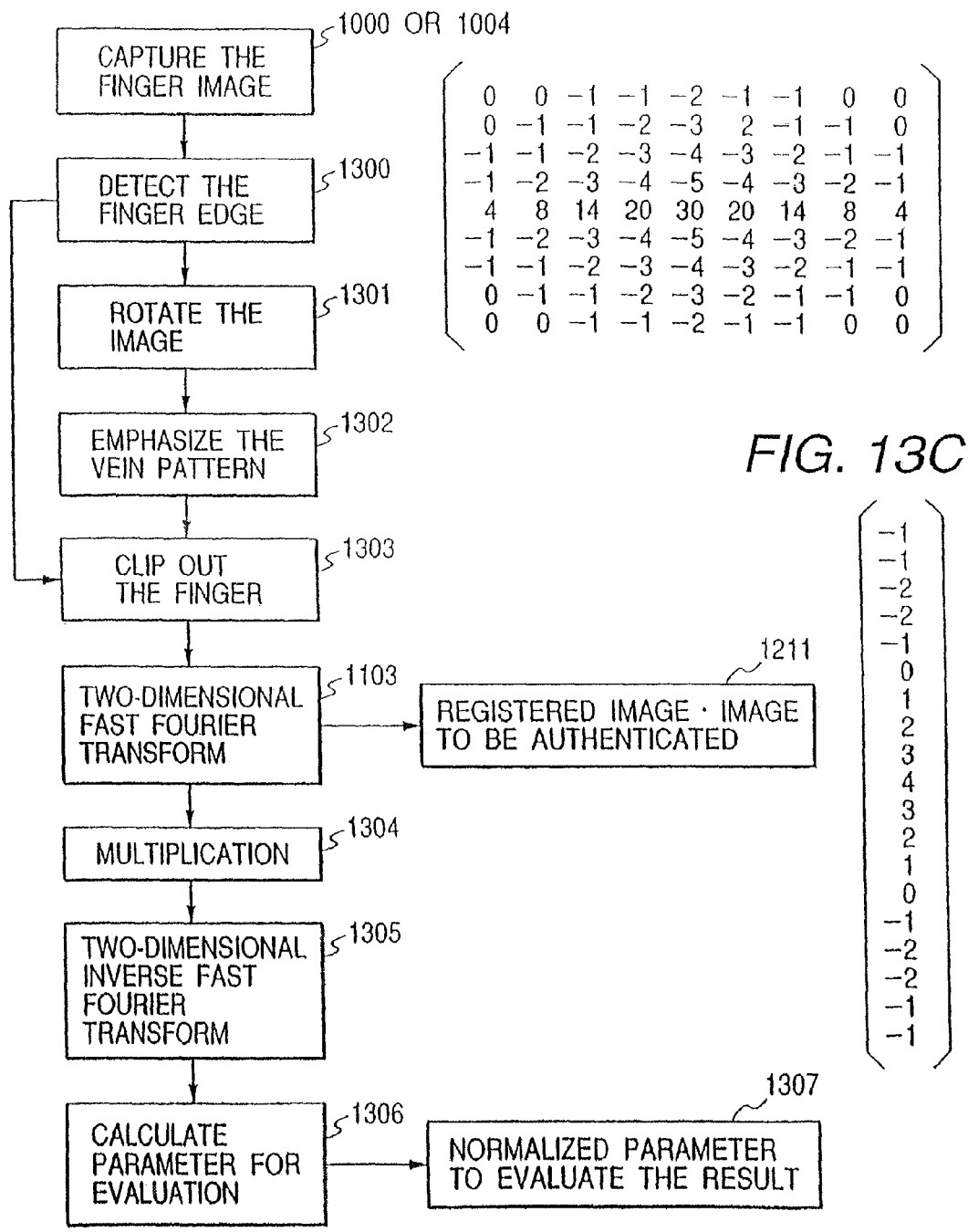

PERSONAL IDENTIFICATION SYSTEM

CROSS REFERENCE FOR RELATED APPLICATIONS

This application is a Continuation of U.S. patent application Ser. No. 13/760,537 filed Feb. 6, 2013, which is a Continuation of U.S. patent application Ser. No. 13/416,307 filed Mar. 9, 2012, which is a Continuation of U.S. patent application Ser. No. 12/654,889 filed Jan. 7, 2010, which is a Continuation of U.S. patent application Ser. No. 11/976,681 filed Oct. 26, 2007, which is a Continuation of U.S. patent application Ser. No. 11/892,506 filed Aug. 23, 2007, which is a Continuation of U.S. patent application Ser. No. 11/104,564 filed Apr. 13, 2005, which is a Continuation of U.S. patent application Ser. No. 10/733,396 filed Dec. 12, 2003, which is a Continuation of Ser. No. 09/954,067 filed Sep. 18, 2001. Priority is claimed based on U.S. patent application Ser. No. 13/760,537 filed Feb. 6, 2013, which claims the priority of U.S. patent application Ser. No. 13/416,307 filed Mar. 9, 2012, which claims the priority of U.S. patent application Ser. No. 12/654,889 filed Jan. 7, 2010, which claims the priority of U.S. patent application Ser. No. 11/976,681 filed Oct. 26, 2007, which claims the priority of U.S. patent application Ser. No. 11/892,506 filed Aug. 23, 2007, which claims the priority of U.S. patent application Ser. No. 11/104,564 filed Apr. 13, 2005, which claims the priority of U.S. patent application Ser. No. 10/733,396 filed Dec. 12, 2003, which claims the priority of U.S. patent application Ser. No. 09/954,067 filed Sep. 18, 2001, which claims the priority of Japanese application 2000-290325 filed on Sep. 20, 2000.

BACKGROUND OF THE INVENTION

The present invention relates to a technology for identifying a person using a living body, and more particularly to a technology for identifying a person using a finger vein pattern.

Today, the typical personal identification technology is fingerprint identification. However, the problem is that other person's fingerprint is easily obtained, for example, a criminal's fingerprint is taken in the scene of a crime, and therefore a finger-print may be forged. This problem leads to the development of personal identification technologies other than fingerprint identification. For example, JP-A-7-21373, laid-open Jan. 24, 1995, discloses a personal identification technology thorough the use of a finger blood vessel pattern, and JP-A-10-295674, laid-open Nov. 10, 1998, discloses a personal identification technology through the use of a vein pattern on the back of a hand. These technologies shine a light on a finger or on the back of a hand, capture the reflected light or transmitted light, extract the blood vessel pattern from the captured image, and compare the captured blood vessel pattern with the previously-registered blood vessel pattern to identify a person.

SUMMARY OF THE INVENTION

However, there are some problems in implementing a personal identification system that uses finger vein patterns.

One of the problems is the reproducibility of a captured image. Although a conventional personal identification system has positioning parts such as a pin or a grasping bar for stabilizing the imaging region, an error in the imaging region is unavoidable, when a finger is rotated or moved in the plane or when a finger is rotated on its major axis. Therefore, it is difficult to completely match a registered vein pattern with a vein pattern obtained at identification time, with the result that the performance of identification is reduced. In particular, on a fully-non-contact system on which the finger is not put on something for fixing, a registered vein pattern and a captured vein pattern may differ largely and this difference further reduces the performance of identification.

Another problem is a light source. A conventional personal identification system has no function to adjust the amount of light from the light source. This generates several image-quality problems such as a blurred outline of a captured image, a lack in sharpness, and a low contrast. These problems require a complex image-processing algorithm for correction and sometimes result in the low performance of identification.

According to one aspect of the present invention, means described below is used for improving reproducibility. First means is an algorithm for correcting an error detected during image processing that is executed for matching an imaged finger blood vessel pattern with a registered pattern. This correction prevents the performance of identification from being degraded.

Second means is a three-dimensional imaging of a living body from various angles using a plurality of imaging devices. Even if a registered vein pattern was imaged from only one direction, that is, the registered pattern is two-dimensional data, the finger may be placed freely when imaged for identification. Therefore, even if there is an error in the imaging region, one of the plurality of images may be selected for use in matching. This prevents the performance of identification from being degraded. It is also possible to register three-dimensional vein patterns as patterns to be registered by imaging the vein pattern from a plurality of directions. In this case, one of the plurality of registered vein patterns is selected for matching. This also prevents the performance of identification from being degraded even if there is an error in the imaging region.

Combining the first means with the second means further increases the performance of identification.

A light source with means for optimizing the amount of light at imaging time is used as the light source. This configuration optimizes the amount of light from the light source to make the quality of a captured image best.

BRIEF DESCRIPTION OF THE DRAWINGS

FIGS. 12A-12G are diagrams showing a first example of the creation of an image to be registered and an image to be authenticated in the embodiment of the present invention.

FIGS. 13A, 13B, and 13C are diagrams showing a second example of the creation of an image to be registered and an image to be authenticated in the present invention of the present invention.

DETAILED DESCRIPTION OF THE EMBODIMENTS

First Embodiment

Figure 1:
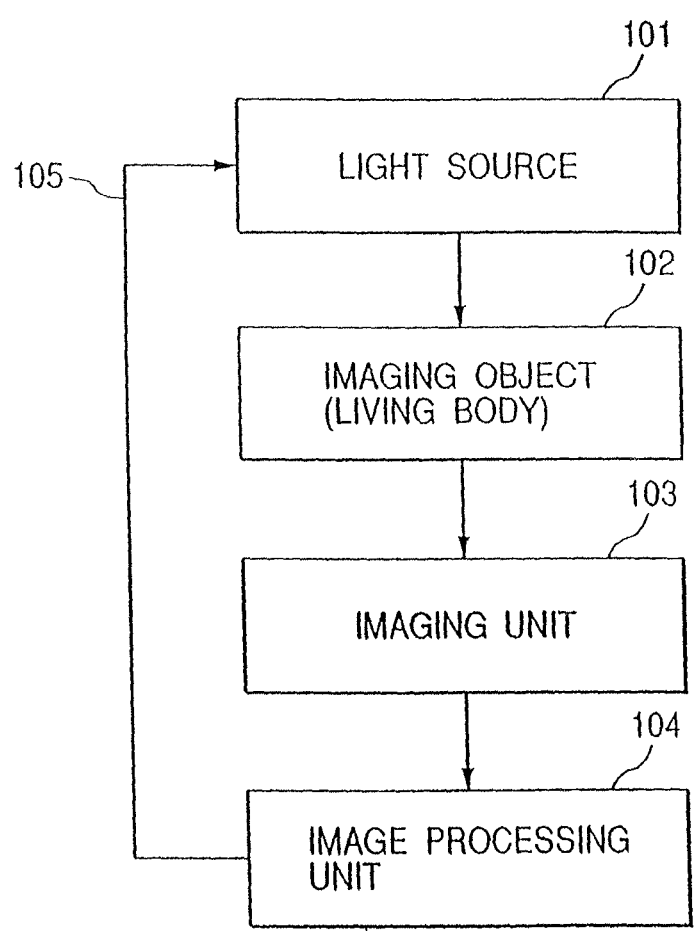
FIG. 1 is a diagram showing an example of the configuration of a system that captures the blood vessel image of a living body using an optical method.
Figure 2:
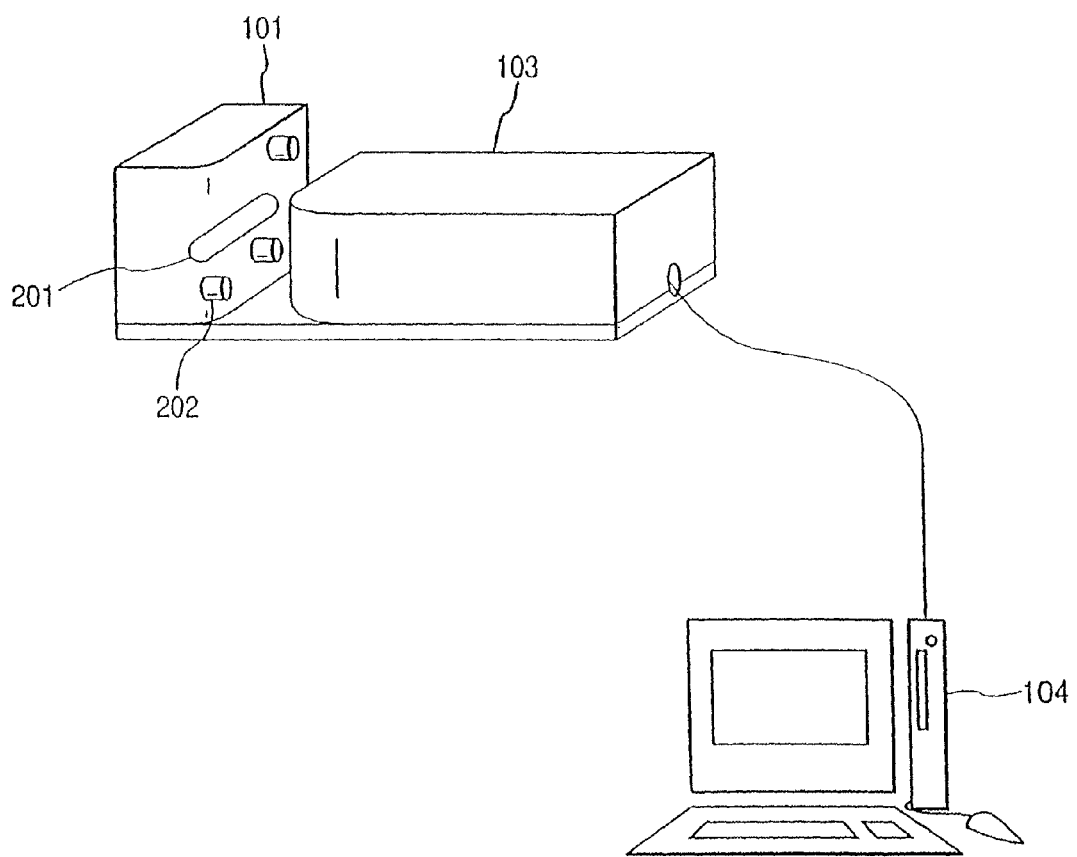
FIG. 2 is an external view of a personal identification system in an embodiment of the present invention.

FIG. 1 is an example of the basic configuration of a personal identification system. FIG. 2 shows an embodiment of a personal identification system according to the present invention. The system comprises a light source unit 101 that shines a light on a finger, an imaging unit 103 that captures the image of a finger, and an imaging processing unit 104 that processes captured image data. As the light source, a semiconductor light source, such as an LED (Light Emitting Diode), is usually used because of its responsiveness and controllability. A CCD camera is used as the imaging unit. A personal computer is conveniently used as the imaging processing unit 104 that captures an image into the computer via the interface such as an image capture board. The imaging processing unit 104 performs processing necessary for identifying a captured image. Numeral 201 indicates a window through which a light from the light source transmits. An automatic shutter may be provided on the window to prevent a light from being leaked from the surrounding part of the finger to ensure accuracy in image processing. An automatic shutter may also be provided separately between the light source and the finger. Numeral 202 indicate pins that fix the imaging region. These pins are optional. If there is no pin, the system is a fully non-contact system. The imaging unit 103 captures a vein pattern image formed by the light transmitted through the finger.

As a vein pattern for use in personal identification, it is more preferable to use the vein pattern of a palm-side finger than to use the vein pattern of a back-side finger. This is because the vein pattern of the back-side finger, which is always exposed externally, is more likely to be stolen. In this embodiment, the system always images the vein pattern of the palm-side finger.

Figure 3A:
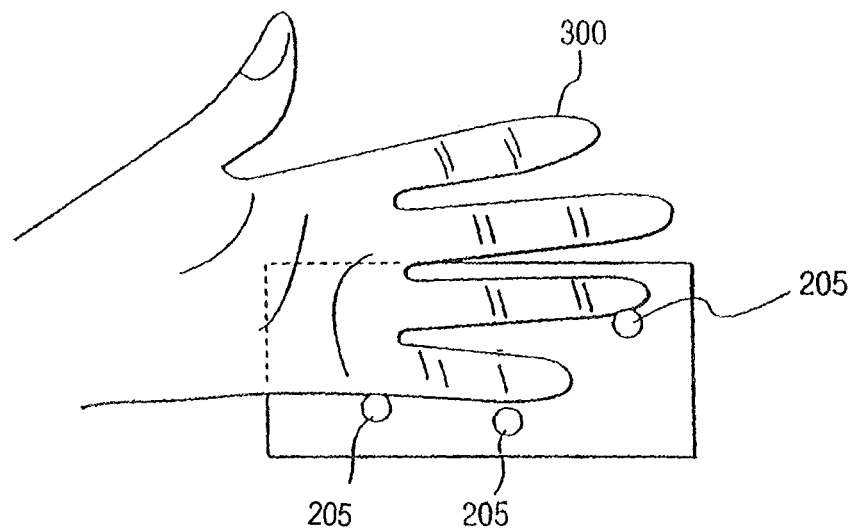
FIGS. 3A and 3B are diagrams showing a low-contact finger positioning method.
Figure 3B:
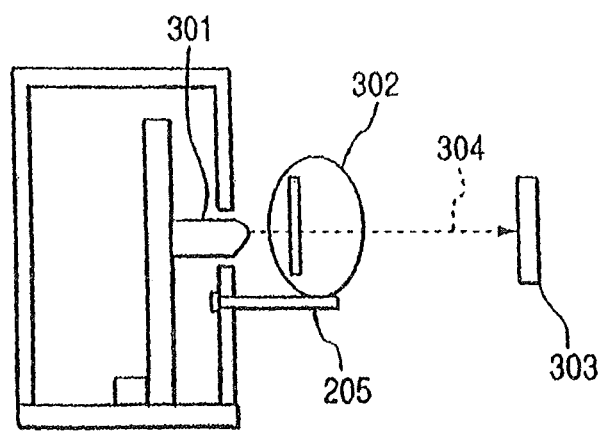

FIG. 3A is a diagram showing the fingers exposed to the light source unit 101 shown in FIG. 1, as viewed from the front. FIG. 3B is a diagram showing the positional relation among light-emitting devices 301 constituting the light source, positioning pins 205, a finger 302, and an imaging device 303, as viewed from the tip of the finger. Numeral 304 indicates a transmitted light.

Figure 4:
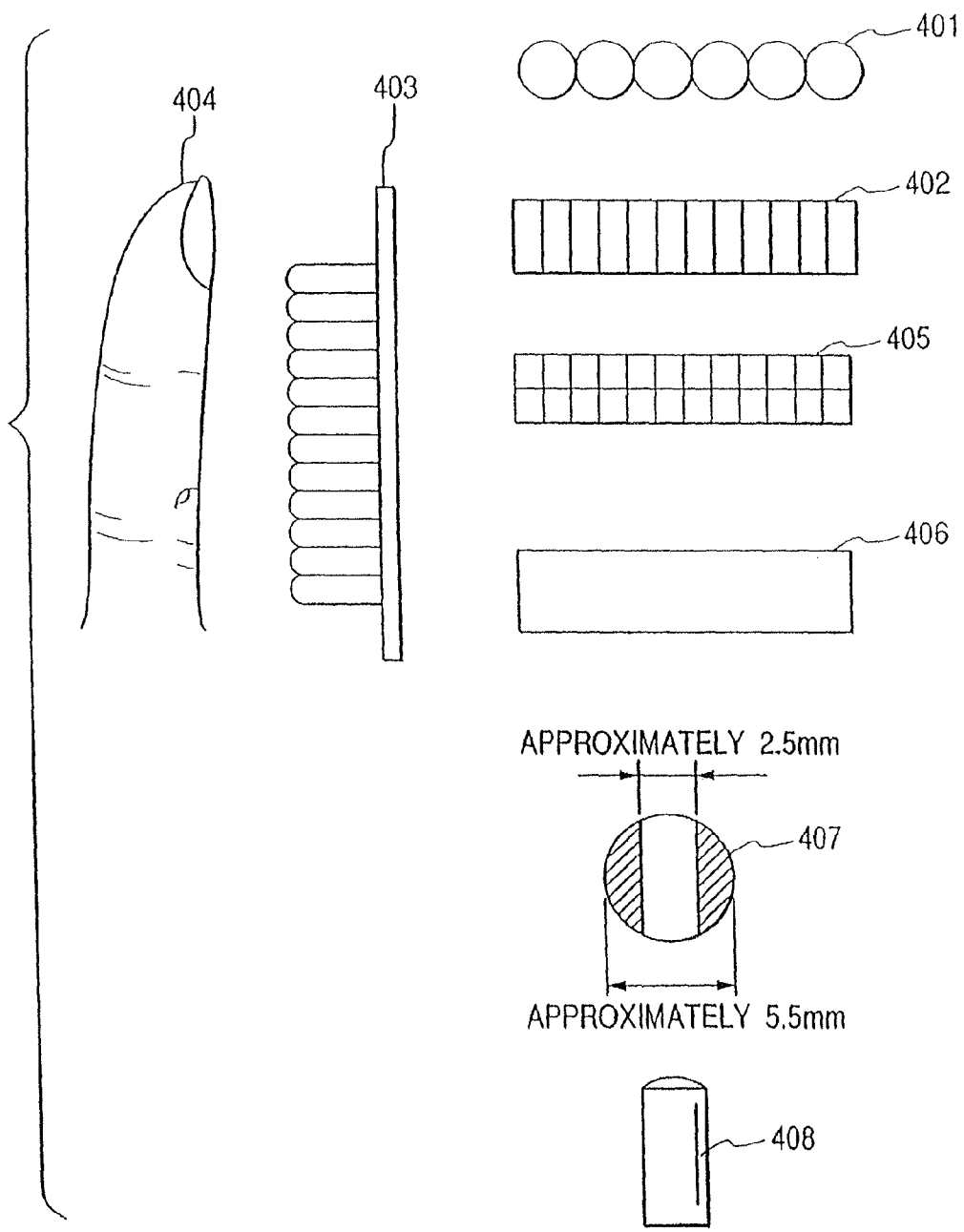
FIG. 4 is a diagram showing a light source composed of arranged light-emitting devices.

A plurality of light-emitting devices, which make up the light source, are arranged according to the shape of a finger, as shown in FIG. 4. Although near-infrared, high-intensity light-emitting diodes (LEDs) are used as the light source, a laser beam may also be used. Numerals 401, 402, 405, and 406 are the front views of many types of light source. Numeral 401 indicates the shape of a light source made up of a plurality of conventional mold-type near infrared light-emitting diodes (near-infrared LEDs) arranged linearly. Because each of the plurality of light-emitting devices indicated by numeral 401 is round, the brightness of the light source is uneven. To solve this problem, the round edges of the plurality of mold-type LEDs are removed to form the light source in the shape indicated by numeral 402. Numeral 407 is the front view, and numeral 408 is the cross sectional view, of an LED whose edges have been removed. The shaded areas indicated by numeral 407 are the areas that are removed. The view indicated by numeral 403, a cross sectional view of the light source indicated by numeral 402, indicates the light source formed by arranging a plurality of LEDs each in the shape indicated by numerals 407 and 408. This arrangement eliminates unevenness in the source light and increases the packing density and the light source intensity. Numeral 405 is an example of a light source made up of a plurality of chip-type LEDs arranged in the plane. In any case, a plurality of LEDs are arranged to detect the location of a finger based on the image monitored by the imaging unit, and the light source elements to be turned on are selected to form a light source according to the thickness and the length of a finger.

Figure 6:
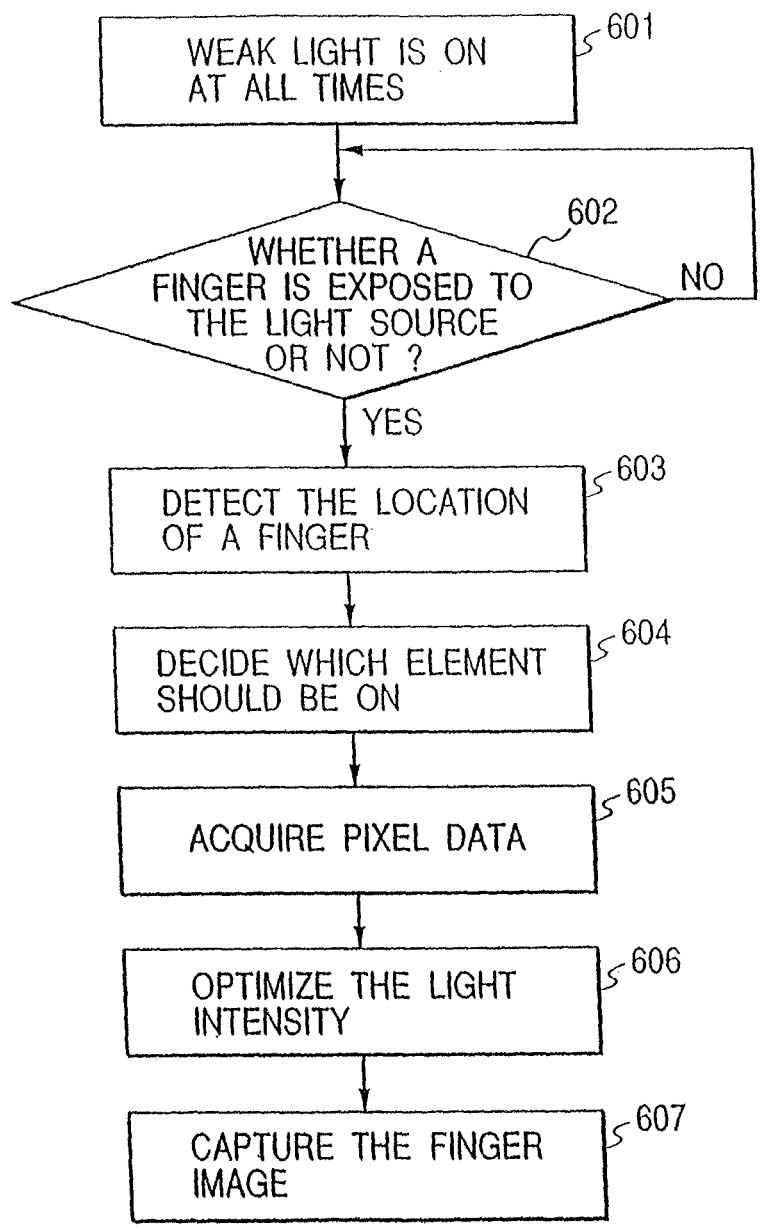
FIG. 6 is a flowchart showing a procedure for capturing a finger image in the embodiment of the present invention.

FIG. 6 shows the procedure for capturing a finger image. As the light source, a weak light is kept on at all times (601). The system checks if a finger is exposed to the weak light (602) and, if a finger is present, detects the location of the finger (603). The presence and the location of the finger are detected based on the pixel value data of the monitor image. Based on the location data of the detected finger, the system decides which elements of the light source to be turned on (604). In addition, the system acquires the pixel data of the monitor image (605) to optimize the amount of light to be supplied from the light source.

The procedure for optimizing the amount of light intensity (606) is as follows. When human being's finger or toe is imaged, the light transmission factor is highest in joints. Therefore, the system detects a joint from the light intensity profile of a finger in the major axis in the image data and uses the maximum intensity value as the intensity value (B) of the joint. This value is compared with the reference value (A) of intensity that is previously set. If A−B<0, the light source is subjected to a feedback to reduce the input current to the light source. If A−B>0, the current input to the light source is increased. When A−B=0, the system ends the adjustment of light intensity, captures the image (607), and starts image processing. Performing this processing for each light-emitting device optimizes not only the amount of light but also the area of the light source. In this case, the light source with the configuration composed of chip-type, small LEDs arranged in the plane, such as the one indicated by numeral 405 in FIG. 4, is best. This configuration is effective for shining a light on a finger whose thickness and length vary greatly.

The method described above adjusts the light source output to optimize the light intensity. Alternatively, adjusting the time during which the light stays on may also optimize the light intensity.

To optimize the amount of light, it is required that the joint be identified. Two sample procedures for identifying the joint will be described. In one procedure, a portion with a relatively high light-intensity value is detected in the image profile of a blood vessel pattern of a finger, imaged through the use of transmitted light, to identify the joint of the finger. Then, a feedback is effected such that no pixel reaches the intensity value of 255 in the 8-bit dynamic range. In another procedure, an image to which a spatial low-pass filter is applied in the major axis direction of a finger in the captured image is evaluated, and the amount of light of the light source striking the joint is adjusted. Any of the procedures described above forms a light source with a spatial intensity distribution.

The above-described configuration for automatically adjusting the amount of light is suitable for capturing a high-contrast blood vessel image. Adjusting the amount of light significantly increases the quality of a blood vessel image, allowing person identification through image-to-image operation of captured images to be performed smoothly.

With a previously registered finger blood vessel as the template, personal identification operation is performed through the calculation of correlation to find a similarity between the blood vessel pattern image of a finger imaged at authentication time and the template. The calculation of correlation is a monotone increasing calculation in which an output value increases in proportion to the degree of matching of two-dimensional array elements. Most typically, a two-dimensional convolution calculation (formula 1) is used.

$$1z(k1,k2)=mnx(i,j)y(k1+1-i,k2+1-j)(k1=1,2,m+n-1, k2=1,2,m+n-1)$$ (Formula 1)

One to ten fingers, usually up to all fingers and toes may be registered. Depending upon the required security level, the number of fingers to be compared may be increased. In some cases, a non-finger blood vessel image may also be used with a finger image.

Figure 10:
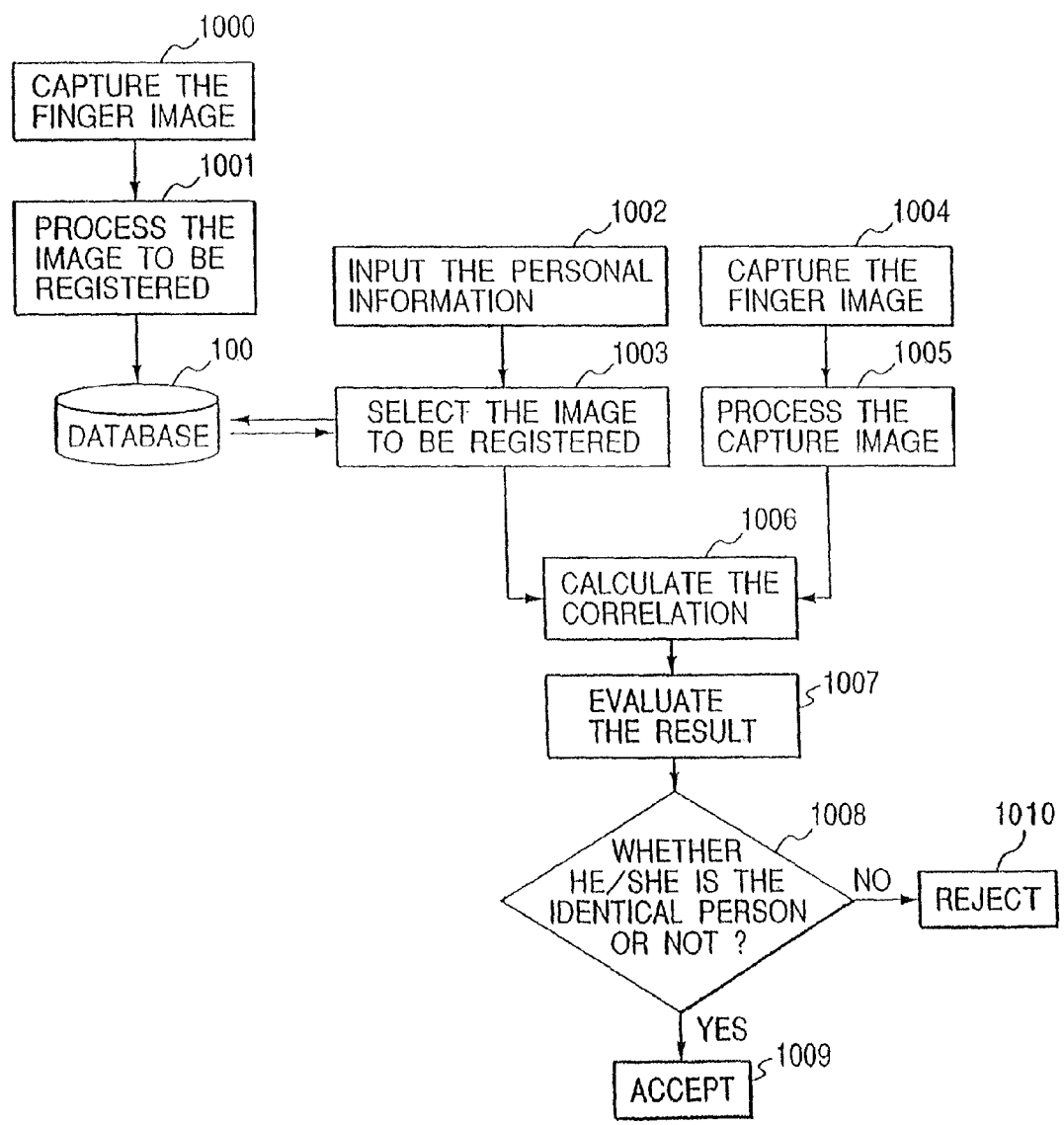
FIG. 10 is a diagram showing the overview of processing from finger image capturing to identification in the embodiment of the present invention.

FIG. 10 is a block diagram showing the personal identification procedure executed based on the image of a detected finger. Personal identification processing is divided roughly into two: registration processing and authentication processing. Registration processing, blocks 1000-1001, is processing in which a database 100 is created based on the images registered at registration time. Authentication processing, blocks 1002-1005, is processing in which a person is accepted or rejected based on the calculation of correlation between an image that is input for identification and a registered image.

During registration processing, the image detecting means captures a person's finger image to be registered (block 1000). At the same time, registration image creation processing, which will be described later, is performed to create a finger-vein emphasized image and the created image is registered (block 1001). On the other hand, during authentication processing, the personal information receiving means receives a person's ID (block 1002) and, at the same time, the registered image corresponding to the received ID is selected from the database (block 1003). In addition, the image detecting means captures an identfee's image to be authenticated (block 1004) and, at the same time, authentication image creation processing, which is similar to registration image creation processing and will be described later, is performed to create a blood vein emphasized image (block 1005), and the calculation of correlation between the captured image and the registered image is executed.

Then, the result of the calculation of correlation is evaluated, and the authentication result indicating whether or not he/she is an identical person is output. Most typically, a two-dimensional convolution calculation is used as the calculation of correlation. In this case, even if the finger is translated in the image plane, the distribution obtained as a result of the two-dimensional convolution operation is also translated with no change in size and shape. Therefore, the evaluation of similarity between these two images automatically corrects errors generated by the translation in the image plane. In addition, taking advantage of the fact that the convolution operation between two data units is equivalent to the inverse Fourier transformation of the product of the Fourier-transformed data units, two-dimensional Fast Fourier Transform (hereinafter called FFT) may be used to speed up the calculation of correlation.

Figure 11:
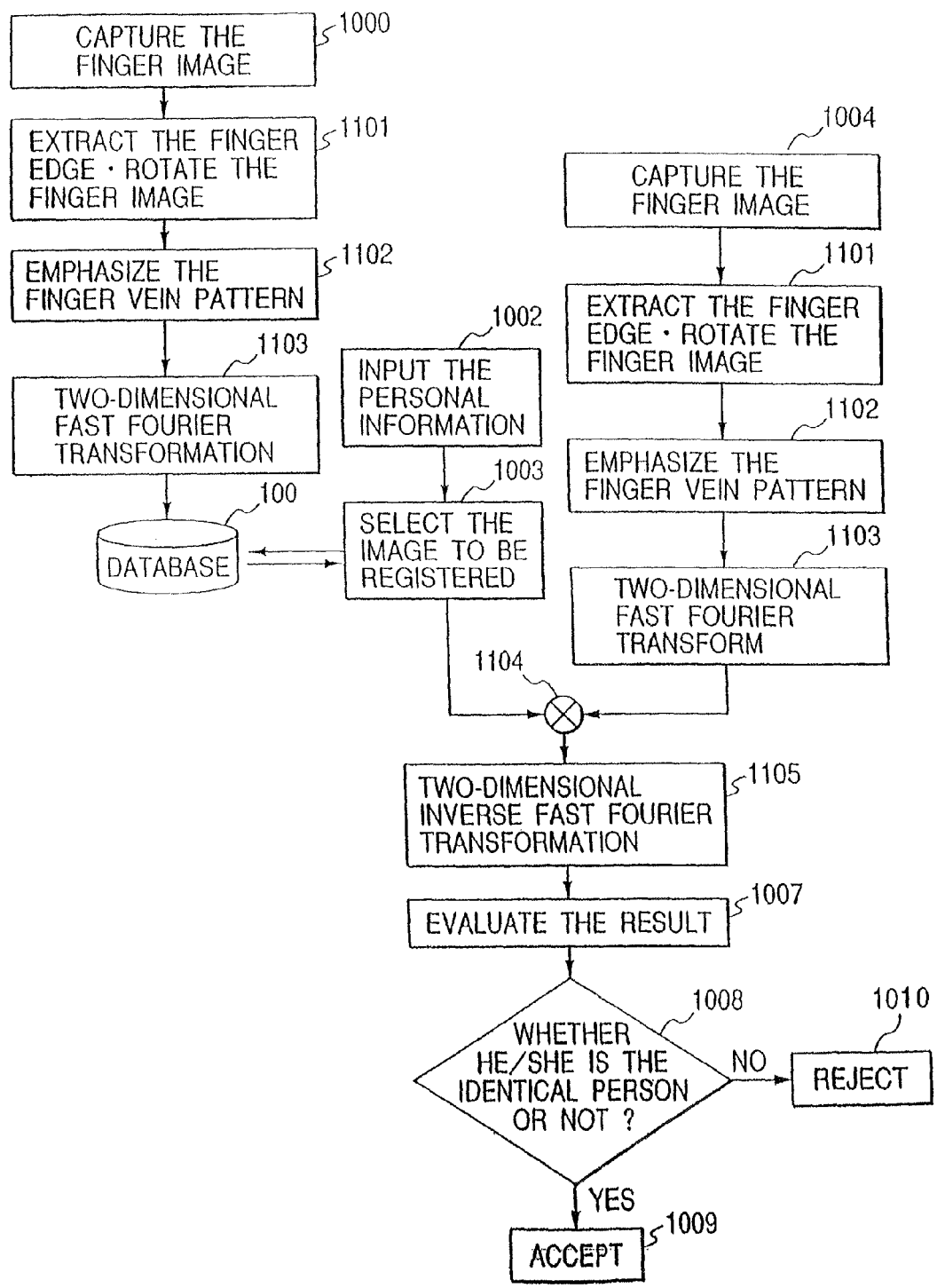
FIG. 11 is a diagram showing a procedure executed from finger image capturing to identification in the embodiment of the present invention.

FIG. 11 is a block diagram showing the image operation procedure when FFT is used to speed up the calculation of correlation. Finger-edge extraction and image-rotation processing (block 1101) is performed for the captured image to be registered or for the captured image to be authenticated. During this processing, the finger edge is extracted and, based on the extracted edge, the image is rotated so that the finger inclination becomes constant. Even when the physical location of the finger is inadequate, this processing corrects an error in the rotation in the image plane and precisely locates the finger in the image space. This processing, combined with the characteristics of the two-dimensional calculation of correlation described above, corrects errors associated with finger movement operations (both translation and rotation) in the image place and correctly locates the finger in the image space.

The image to be registered and the image to be authenticated, for which finger-edge extraction and image-rotation processing has been performed, are each converted to a finger-vein emphasized image (block 1102), and the two-dimensional FFT operation is executed for the converted result (block 1103). The result generated for the former image is registered. The result generated for the latter image is multiplied by the registered image selected based on the received ID (block 1104). Then, two-dimensional fast inverse Fourier transformation (Inverse FFT, hereinafter called IFFT) is performed for the result (block 1105) to produce the correlation distribution of the registered image and the image to be authenticated. As described above, the same image processing is performed for blocks 1101 to 1103 during registration image creation processing (block 1001) and during authentication image creation processing (block 1005).

The personal identification system may include a light source which shines a light on the imaging region of a living body, an imaging unit which detects a transmitted light from the imaging region to image the living body, and an imaging processing unit which extracts the blood vessel pattern of the living body from the image converted by the imaging unit and compares the pattern with a previously-registered blood vessel pattern, wherein the image processing unit may comprises means for correcting an error between the registered blood vessel pattern and the imaged blood vessel pattern.

FIG. 12A is a block diagram describing in detail an example of the blood vessel emphasizing processing procedure. FIGS. 12B-12D are the general views of a finger image generated by each processing procedure.

An input image is divided roughly into a finger 120, an edge 121, and a surrounding part 122. In general, the image also includes various noises 123 that must be removed. In FIG. 12A, blocks (1201)-(1203) execute the procedure for extracting the edge of a finger, blocks (1204)-(1206) execute the procedure for extracting an image corresponding to the background (back-trend) that is the part where no finger vein pattern is present, and blocks (1207)-(1211) execute the procedure for removing the back-trend from the original image to extract only the necessary vein pattern.

In response to a captured finger image (block 1200), a high-cut filter filters out small components such as noises 123 (block 1201) and emphasizes only relatively large components such as the edge. Then, the procedure executes directional differentiation (block 1202) to give an edge-enhanced image (FIG. 12C).

As shown in the image in FIG. 12C, the edge 121 in the edge enhanced image is enhanced and has a large pixel value. Based on the pixel value, the procedure performs edge detection processing to obtain only the location information on the edge 121 (block 1203). Then, based on the location information on the detected edge, the procedure produces an image (FIG. 12D) generated by clipping out only the finger 120 from the original image shown in FIG. 12B (block 1204).

In the image shown in FIG. 12D, the average of the pixel values outside the finger is made equal to the average of the pixel values inside the finger. Without this averaging operation, the finger edge component emphasized by finger the edge emphasizing processing would affect the operation, preventing personal identification operation through the vein pattern from being performed properly.

When the average of the pixel values inside the finger is shifted to 0, the pixel value of 0 is inserted into the surrounding part 122 of the image shown in FIG. 12D. Then, after an image (FIG. 12E) is created by extraporation of the values of the surrounding part 122 of the image shown in FIG. 12D in the vertical direction by use of the values of the edge 121 (block 1205), only the large component, that is, the back-trend, is extracted with a high-cut filter (block 1206). In the block 1205, extrapolation is performed to prevent the high-cut filter in the block 1206 from unintentionally emphasizing the pixel value near the edge 121.

Next, after creating a difference image between the original image (FIG. 12B) and the back-trend image (block 1208), the clipped-out image (FIG. 12F) of the difference image is obtained based on the detected edge location. The difference corresponds to a part processed by a low-cut filter. This processing removes the back-trend component generated by a light transmitted through muscles or fat tissue or by diffused lights. Therefore, an image where only the blood vessel component is emphasized, such as the one shown in FIG. 12F, is obtained.

Finally, according to the inclination of the finger obtained from the detected edge location, the image is rotated such that the finger is inclined at a fixed angle, typically, at an angle of 0 degree (FIG. 12G) (block 1209). This image is output as the image to be registered or as the image to be authenticated (block 1210).

Figure 15:
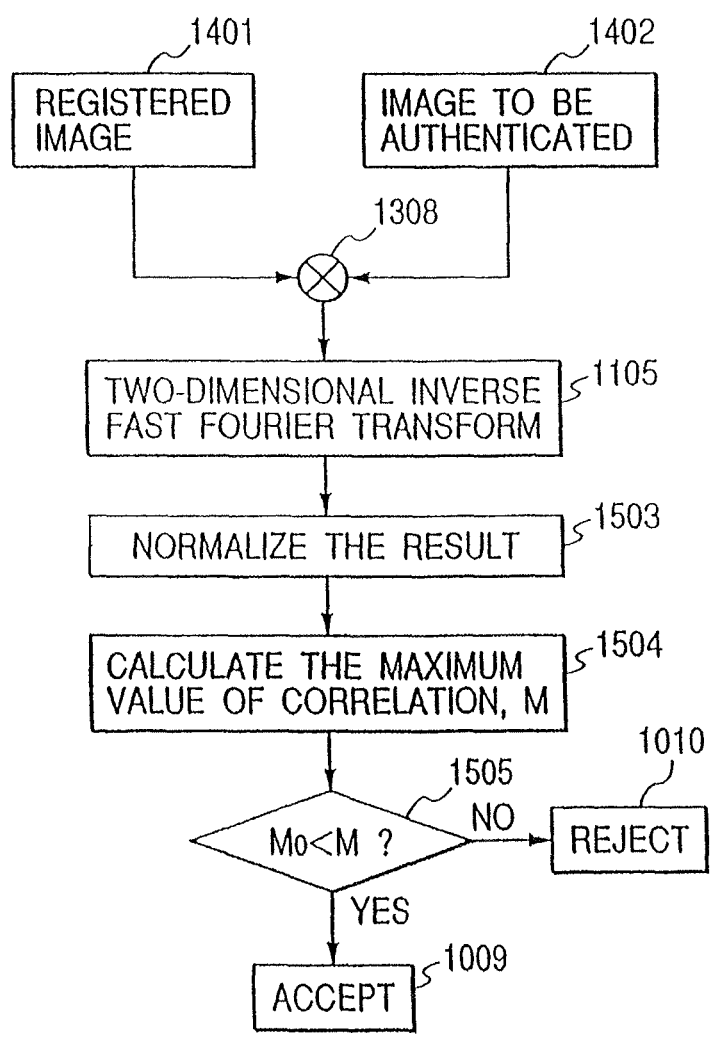
FIG. 15 is a diagram showing a second example of the method for normalizing identification processing results in the embodiment of the present invention.

FIG. 15 is a block diagram showing the authentication procedure that is executed after the image to be authenticated is obtained by the procedure in FIG. 12. The calculation result of correlation between the registered image and the image to be authenticated is normalized by the formula shown below (formula 2) (block 1503), followed by the extraction of the maximum value M of the distribution (block 1504).

$$C_{ab}(x,y) / (\sqrt{\sqrt{C_{aa}(x,y)}} \times \sqrt{\sqrt{C_{bb}(x,y)}})$$ (Formula 2)

where, $C_{ab}(x,y)$ is the correlation distribution of the registered image and the image to be authenticated. $C_{aa}(x,y)$ and $C_{bb}(x,y)$ represent a sum of squares of respective pixel data of a registered image and a sum of squares of respective pixel data of an image to be authenticated, respectively.

If the calculated maximum correlation value M of the registered image and the image to be authenticated is larger than the threshold Mo, the identifee is regarded as valid and is accepted (block 1009). If the value M is less than the threshold Mo, the identifee is not regarded as valid and is rejected (block 1010). The threshold Mo should be statistically calculated in advance by entering sample images. When the average of pixel values inside the finger is shifted to the value of 0, the value of Mo ranges from 0.45 to 0.55. However, the value is not limited to this range.

If a person is not acknowledged, he or she must re-enter data, such as finger image capture data, to make a re-authentication request a predetermined number of times. For example, a person who is successfully acknowledged is allowed to access managed data or areas. On the other hand, a person who is not acknowledged makes a re-authentication request a predetermined number of times and, if the person is not yet acknowledged, access to the managed data or areas is rejected.

It is desirable that the personal information input means, which is used to select a person's registered finger image from the database, not be a keyboard but a non-contact device. For example, personal information such as a name or a password, or a keyword that is known only to the person, may be input via voice or, alternatively, stored on a non-contact IC card. This type of input means makes it possible to build a personal identification system that takes advantage of non-contact features. This processing may be done independently by the CPU of the identification system or by an online system via computers.

An image to be authenticated is stored on a fixed medium connected to the authentication server, a medium containing semiconductor memory, or a portable medium such as a floppy disk. This method eliminates the need for keyboard operation on a banking ATM, solves the problems associated with a contact input device, and relieves a maintenance nuisance. The advantages described above make this method suitable for gaining access to personal information in an electronic government or for authentication in online transactions.

Second Embodiment

In the first embodiment, a finger is imaged with one CCD camera. A finger may also be imaged with a plurality of CCD cameras during authentication or image capturing to increase the performance of identification.

Figure 5:
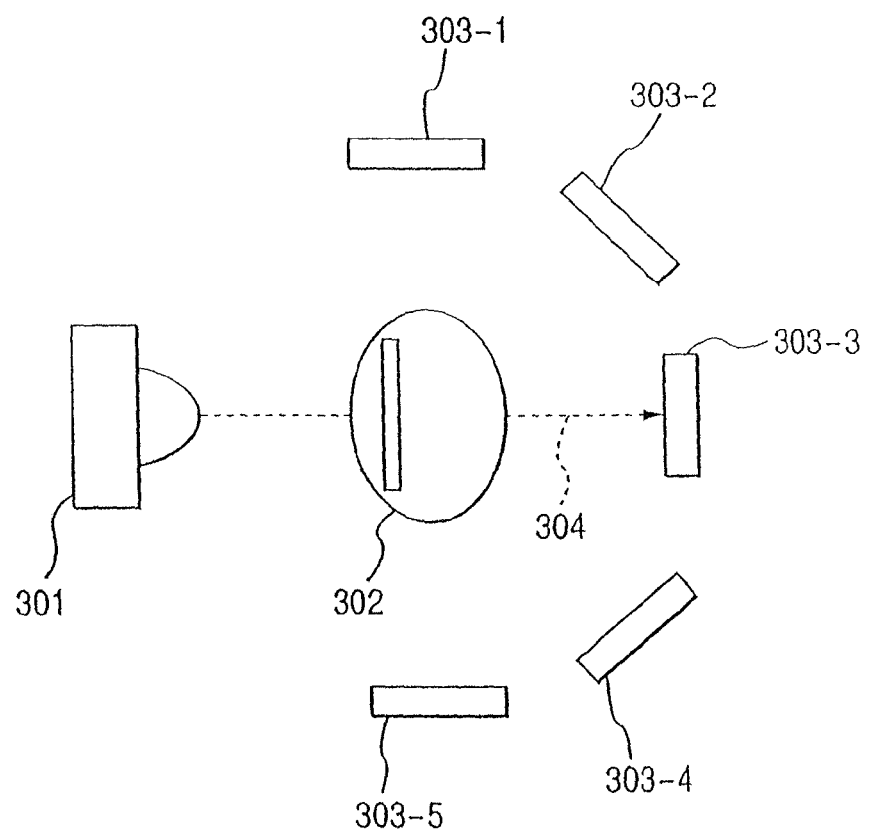
FIG. 5 is a diagram showing a three-dimensional imaging method using the three-dimensional arrangement of imaging devices.

FIG. 5 shows the arrangement of this embodiment where a plurality of CCD cameras are used; that is, a light source 301, a finger 302, and CCD cameras (303-1-303-5) are arranged as shown. In this embodiment, a plurality of finger vein patterns are captured from a plurality of directions using a plurality of CCD cameras, and the pattern most similar to the registered vein pattern is selected for authentication. Alternatively, a plurality of vein patterns to be registered are captured and saved as three-dimensional data and, from these patterns, the pattern most similar to the vein pattern to be authenticated is selected for authentication. This method is particularly effective for preventing the performance of identification from being degraded when the finger is rotated in the major axis direction and, at the same time, effective for implementing a complete-non-contact device.

Not only a still image but also a moving image may be imaged. When imaging and registering a three-dimensional moving image, a finger is rotated in the configuration, shown in FIG. 3B, which is composed of the light source LED (301), finger (302), and imaging device (303). Alternatively, as shown in FIG. 5, a plurality of CCD cameras may be used to capture an image from a plurality of points. A person is authenticated either by a two-dimensional image imaged by the imaging unit in the configuration shown in FIGS. 3A and 3B or by a three-dimensional image imaged by the imaging unit in the configuration shown in FIG. 5.

The image is captured into the processing unit for use in image operation and authentication. Because the most similar vein pattern to be registered or the most similar vein pattern to be authenticated is selected for authentication, this method is advantageous in that the performance of identification is increased and the image operation load is reduced.

Third Embodiment

FIGS. 13A-13C are block diagrams showing in detail one example of blood vessel emphasizing processing (corresponds to blocks 1101-1103 in FIG. 11). When a finger image is received (block 1000 or 1004), edge detection processing is performed to detect the location of the finger edge (block 1300). Based on the detected edge location, image rotation processing is performed so that the image is rotated such that the finger is inclined at a fixed angle, typically, at an angle of 0 degree (block 1301). Blood pattern emphasizing processing is performed for the obtained image (block 1302).

For example, blood pattern enhancement processing is performed using a filter, such as the one shown in FIG. 13B, designed to remove high-frequency components in the major axis direction of the finger, and low-frequency components in the minor axis direction. Filtering may be done either by the convolution operation (formula 1) in the real space or by the multiplication operation in the frequency domain. For the image where the blood vessel pattern is enhanced, the average of the pixel values outside the finger is made equal to the average of the pixel values inside the finger, based on the edge location detected by the edge detection processing (block 1300), as in FIGS. 12A-12G (block 1303). When shifting the average of the pixel values inside the finger to 0, the pixel values outside the edge are set to 0.

Two-dimensional FFT transform operation is performed for the obtained image (block 1103), squaring of respective pixel data of the obtained is performed (block 1304), and then two-dimensional IFFT operation is performed (block 1305). For the obtained result, the parameters for evaluation are calculated (block 1306). Because vessels usually run in the major axis direction of the finger rather than in the minor axis direction, the difference in the blood vessel pattern is most reflected in the peak shape in the minor axis direction of the finger in the two-dimensional convolution operation result. Therefore, the parameters for evaluation are calculated, for example, using a kernel composed only of the elements in the minor-axis direction of the finger such as the one shown in FIG. 13C, to perform convolution operation in the real space or multiplication in the frequency domain.

If the input image is an m.times.n matrix and the kernel is a p.times.1 matrix, then the result of the calculation of parameters for evaluation is a (m+p−1).times.n matrix. The maximum value Mx of the resulting matrix is calculated for each of the registered image and the image to be authenticated. Let the maximum value be M1 and M2, respectively. M1 is stored in the database (100).

Figure 14:
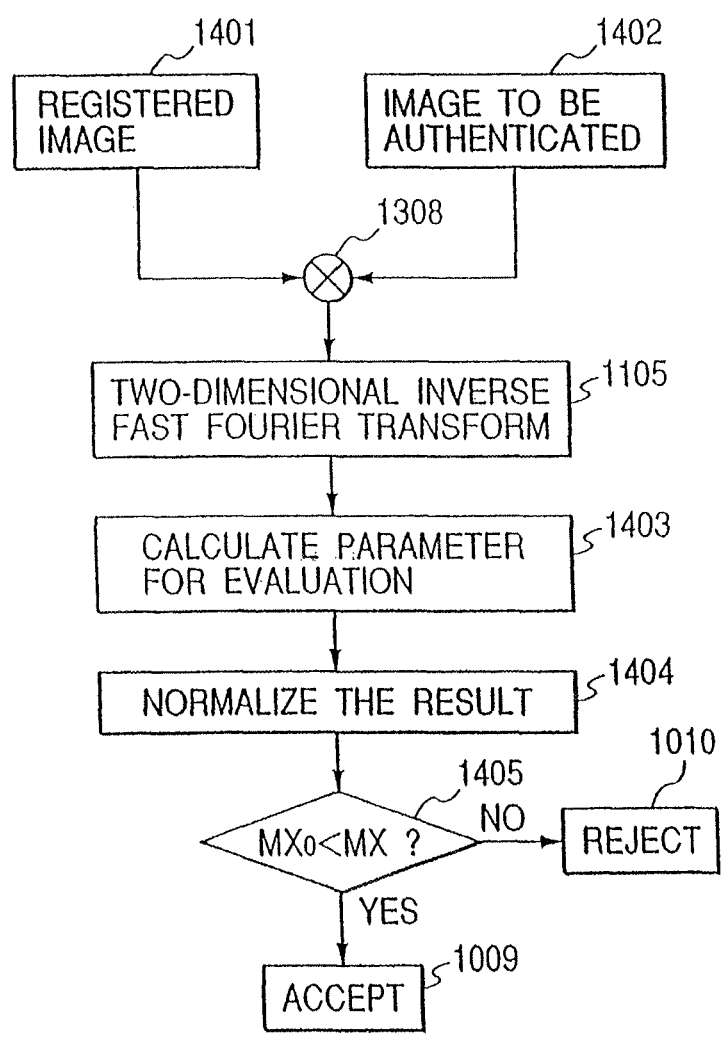
FIG. 14 is a diagram showing a first example of the method for normalizing identification processing results in the embodiment of the present invention.

FIG. 14 is a block diagram showing the authentication procedure executed after block 1007 when an image is processed according to the procedure shown in FIG. 13A. Calculation of parameters for evaluation (block 1403) is executed for the result of the calculation of correlation between the registered image and the image to be authenticated. For the calculated maximum value M, normalization operation (block 1404) is performed according to the formula (formula 3) based on M1 and M2 described above.

$$M = M.sub.12 / \{\text{square root}\}\{\text{square root over}(M.sub.1 \times M.sub.2)\}$$ (Formula 3)

If the calculated value MX of correlation between the registered image and the image to be authenticated is larger than the threshold Mxo, the identifee is regarded as valid and is accepted (block 1009). If the value Mx is less than the threshold Mxo, the identifee is not regarded as valid and is rejected (block 1010). The threshold Mxo should be statistically calculated in advance by entering sample images. When the average of pixel values inside the finger is shifted to 0 as described above, the value of Mxo ranges from 0.3 to 0.4 but is not limited to this range.

Fourth Embodiment

Because a fully non-contact method is not always advantageous in cost, processing time, and compactness, it is more practical for a device, while still retaining the non-contact features described above, to have the minimum positioning parts required for fixing an imaging region such as a finger or a hand. Note that more bacilli are present on the palm of a hand of a human being than on the back. Therefore, even on a device on which the imaging region contacts the positioning parts, the palm of the hand should not contact the device. The following describes an example.

Figure 7:
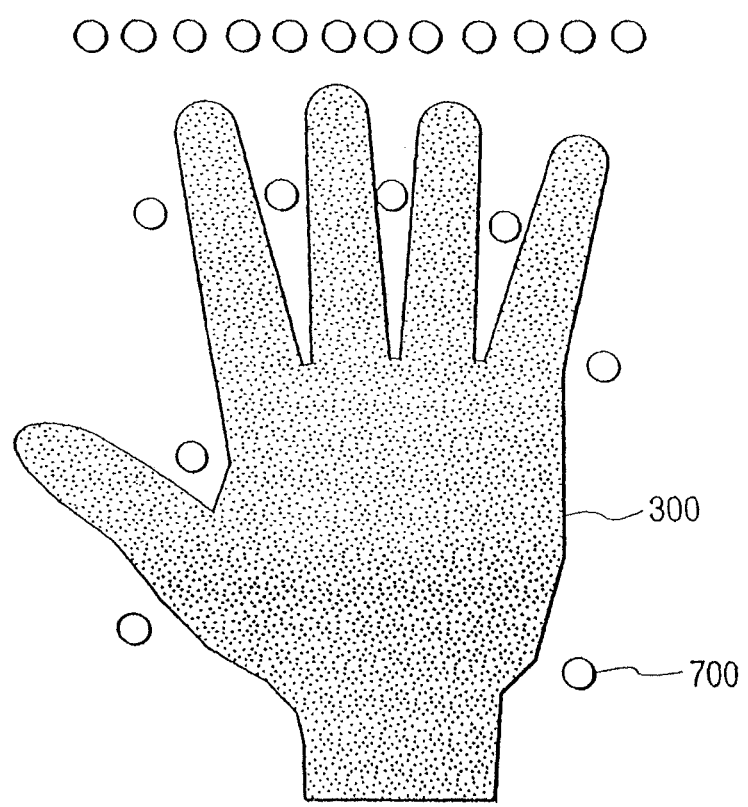
FIG. 7 is a diagram showing the positioning of fingers at identification time when air is jetted.
Figure 8:
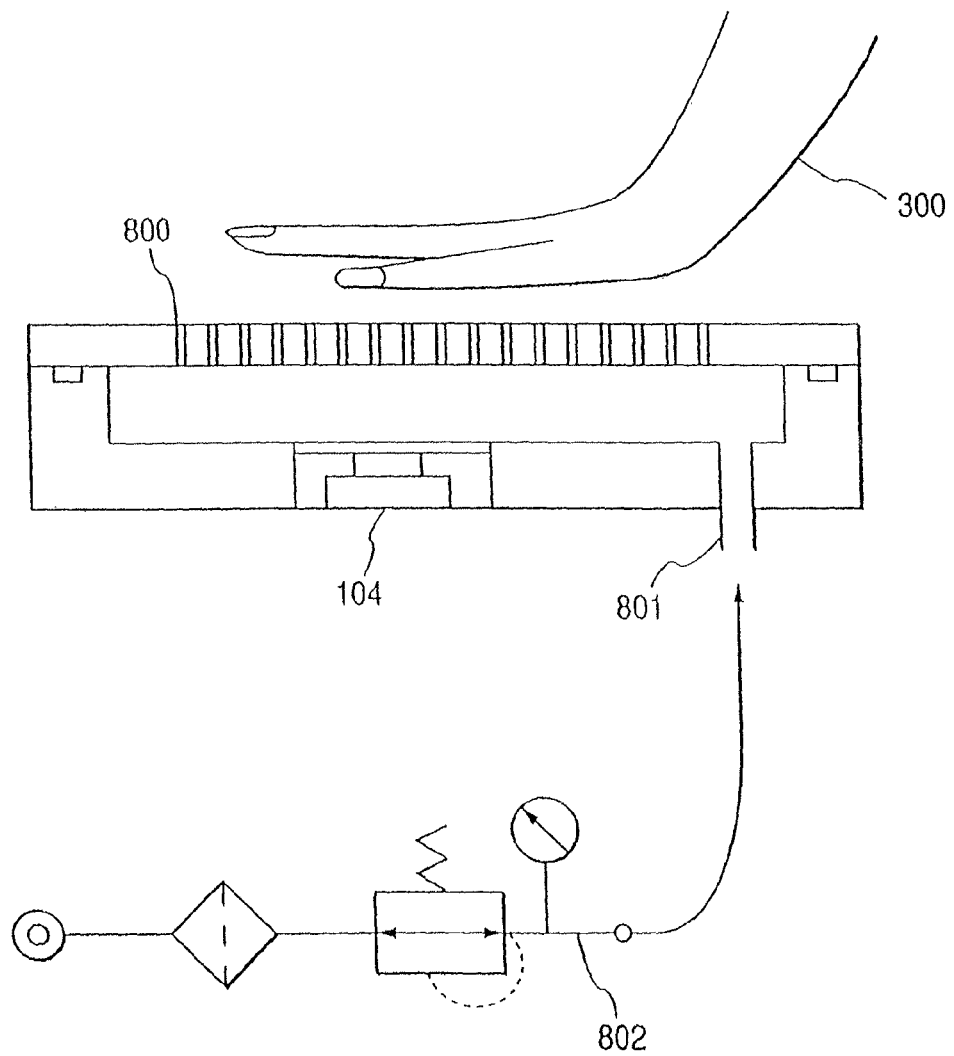
FIG. 8 is a diagram showing an identification device using air jet used in an embodiment of the present invention.
Figure 9A:
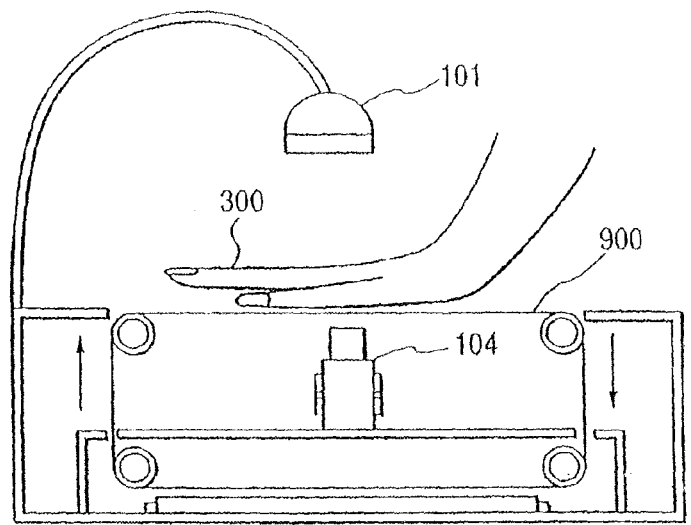
FIGS. 9A, 9B, and 9C are diagrams showing the sterilization method used on a contact identification device.
Figure 9B:
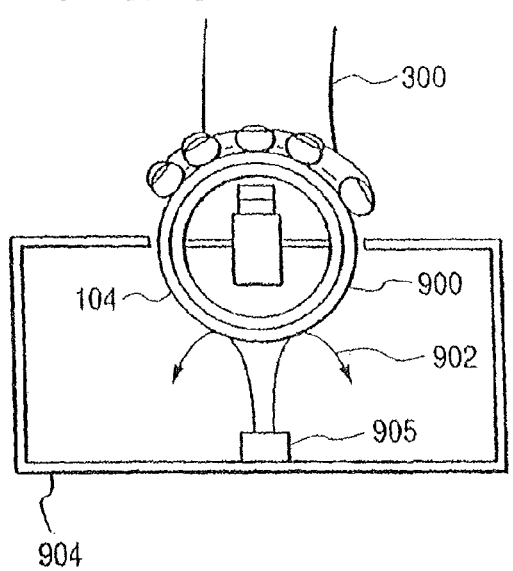
Figure 9C:
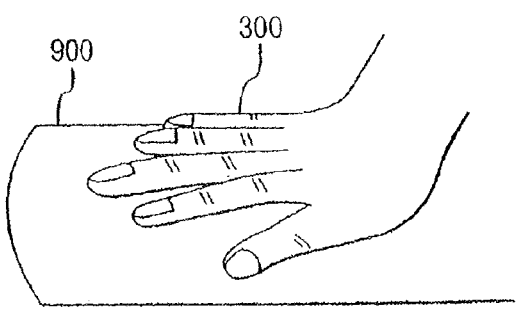

FIG. 7 shows a finger positioning method using air jet instead of the pins in FIGS. 3A and 3B. Compressed air is jetted from the jet hole (FIG. 7(700), FIG. 8(800)). Numeral 802 indicates an air compressor and a control system, and numeral 801 indicates a compressed-air intake. In FIG. 8, an air jet from the air jet hole on the palm side of the hand prevents the palm from contacting the device. At identification time, a person places his or her hand naturally in the position where the air jet from the hole 700 in FIG. 7 does not blow strongly against the fingers.

An optical sensor, which measures the distance between the device and the palm to check to see if the height, from the device to the palm, is correct, is provided to control image capturing. If the height is incorrect, incorrect-height information is sent to the identifee. Because the palm does not contact any object as described above, this embodiment reduces the possibility of bacillus contagion caused by an unspecified number of persons using the device. Therefore, it can be said that the method in this embodiment in which the palm does not contact any object is better than a method in which the palm contacts the device.

Winding a palm-contact sheet (900) or sterilizing the sheet with a ultraviolet light source (901) or a disinfectant (902) allows even a palm-contact device to take advantage of the identification system according to the present invention that keeps the device clean. For full sterilization, an optical-catalyzed (titanic-oxide) coated sheet is used as the palm-contact sheet (900) and a ultraviolet light is shown on the sheet. Including this type of sterilizer keeps the device clean.

The embodiments described above allow a reliable, secure, and easy-to-use personal identification system to be built. That is, a familiar, forgery-proof, highly-accurate personal identification system may be implemented while eliminating or minimizing maintenance management work executed for preventing contagion caused by dirt on the device or for preventing errors in obtained data.

What is claimed is:

1. An imaging device for imaging a blood vessel pattern of a human body, the imaging device comprising:
   a surface region on which a part of the human body to be imaged is received;
   a plurality of light sources for radiating light toward the surface region;
   a light amount adjusting unit for adjusting an amount of light radiated from the plurality of light sources;
   an imaging unit for imaging the surface region; and a processing unit for processing information acquired from the imaging unit, and wherein the imaging unit is configured to take an image in accordance with light radiated by the plurality of light sources, and wherein the processing unit is configured to:

detect a position of a part of the human body received on the surface region based on variation in an amount of light at the surface region due to interruption in the light radiated from the plurality of light sources, and initiate an adjustment of the amount of light radiated from at least part of the plurality of light sources by the light amount adjusting unit based on the position detected.

2. The imaging device according to claim 1, wherein the light amount adjusting unit is configured to increase the amount of light to be radiated from the plurality of light sources.

3. An imaging device for imaging a blood vessel pattern, the imaging device comprising:

a surface region on which a finger to be imaged is received;

a plurality of light sources for radiating light toward the surface region;

a light amount adjusting unit for adjusting an amount of light radiated from the plurality of light sources; and an imaging unit for imaging the finger on the surface region, and wherein the imaging unit is configured to take an image in accordance with light radiated by the plurality of light sources, determine a position of the finger on the surface region based on variation in an amount of light at the surface region due to interruption in the light radiated from the plurality of light sources, and to initiate an adjustment for increasing an amount of light radiated from at least as part of the plurality of light sources by the light amount adjusting unit based on the position determined.

4. The imaging device according to claim 3, further comprising a calculating unit for making a personal authentication based on information on vessels included in an image taken by the imaging unit according to light radiated from the plurality of light sources upon the amount of light radiated from the at least a part of the plurality of light sources having been adjusted by the light amount adjusting unit.

5. The imaging device according to claim 1, further comprising a calculating unit for making a personal authentication based on information on vessels included in an image taken by the imaging unit according to light radiated from the plurality of light sources upon the amount of light radiated from the at least a part of the plurality of light sources having been adjusted by the light amount adjusting unit.

6. The imaging device according to claim 1, further comprising a finger guiding member for guiding a finger to be imaged to the surface region.

7. The imaging device according to claim 2, further comprising a calculating unit for making a personal authentication based on information on vessels included in an image taken by the imaging unit according to light radiated from the plurality of light sources upon the amount of light radiated from the at least a part of the plurality of light sources having been adjusted by the light amount adjusting unit.

8. A personal authentication device for making a personal authentication, the personal authentication device comprising:

a surface region on which a part of the human body to be imaged is received;

a plurality of light sources for radiating light toward the surface region;

an imaging unit for imaging the surface region; and a calculating unit for making a calculation in accordance with an image taken by the imaging unit, and wherein the imaging unit is configured to take an image in accordance with a first amount of light being radiated by the plurality of light sources, and wherein the calculating unit is configured to detect that a part of the human body to be identified is received on the surface region based on variation in an amount of light at the surface region due to interruption in the first amount of light radiated from the plurality of light sources, detect positional information of the part of the human body to be identified, initiate an adjustment of an amount of light radiated by the plurality of light sources to a second amount of light based on the positional information, take an image of a blood vessel pattern in accordance with the second amount of light being radiated by the plurality of light sources, and make a personal authentication in accordance with the image of the blood vessel pattern taken with the second amount of light being radiated by the plurality of light sources.

9. The personal authentication device according to claim 8, further comprising a finger guiding member for guiding a finger to be imaged to the surface region.

10. A blood vessel pattern imaging device, comprising:

a surface region on which a part of the human body to be imaged is received;

a plurality of light sources for radiating light toward the surface region;

a light amount adjusting unit for adjusting an amount of light radiated from the plurality of light sources;

an imaging unit for imaging the surface region; and a processing unit for processing information acquired from the imaging unit, and wherein the imaging unit is configured to take an image in accordance with light radiated by the plurality of light sources, and wherein the processing unit is configured to:

detect a position of a part of the human body received on the surface region based on the image taken by the imaging unit, and initiate an adjustment of the amount of light radiated from at least part of the plurality of light sources by the light amount adjusting unit based on the position detected.

11. The blood vessel pattern imaging device according to claim 10, further comprising a finger guiding member for guiding a finger to be imaged to the surface region.

12. The blood vessel pattern imaging device according to claim 10, wherein the light amount adjusting unit is further configured to increase an amount of light to be radiated form the plurality of light sources.

13. The blood vessel pattern imaging device according to claim 10, further comprising a calculating unit for making a personal authentication based on information on vessels included in an image taken by the imaging unit according to light radiated from the plurality of light sources upon the amount of light radiated from the at least a part of the plurality of light sources having been adjusted by the light amount adjusting unit.

* * * * *